Patented Apr. 17, 1934

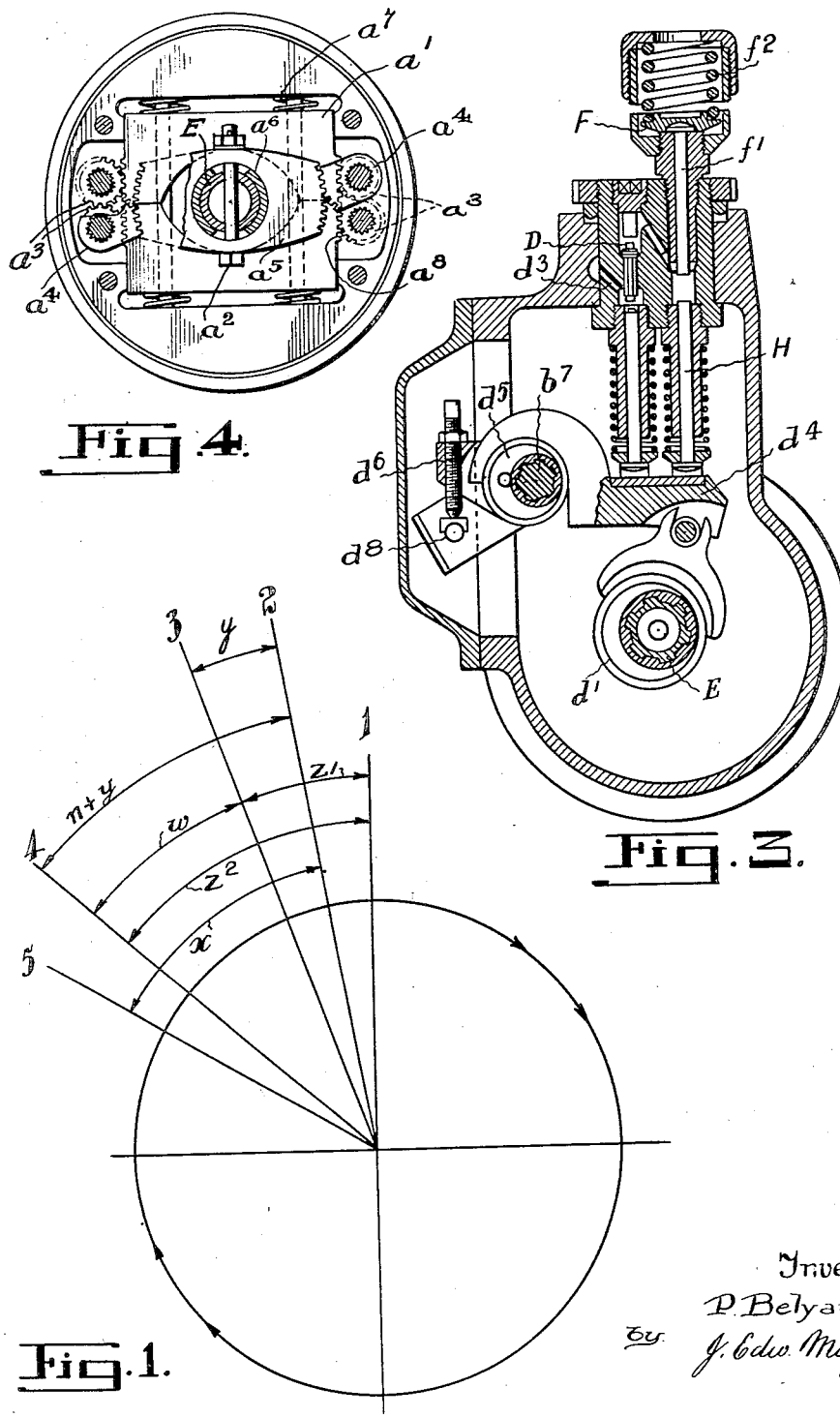

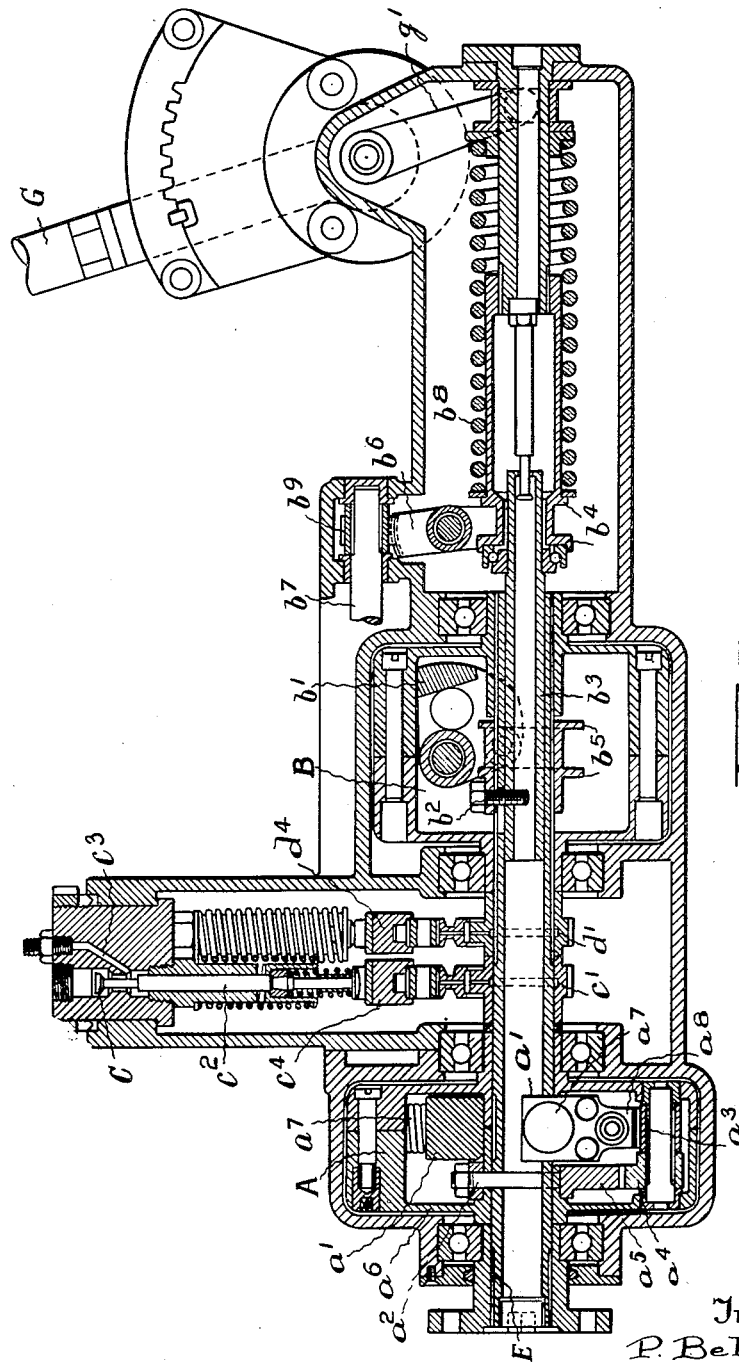

1,955,526

UNITED STATES PATENT OFFICE 1,955,526

FUEL INJECTION PUMP FOR SOLID INJECTION OIL ENGINES

Paul Belyavin, Glasgow, Scotland, assignor to Belfrost Diesels Limited, Hamilton, Ontario, Canada Application January 8, 1932, Serial No. 585,544
In Great Britain January 15, 1931

2 Claims. (Cl. 123—140)

In most of the existing liquid fuel injection systems, the rate of fuel injection depends on the engine speed.

Consequently, in engines which are running with varying speeds, at low speeds the rate of fuel delivery from the pump to the injection drops in proportion to the drop in speed, and the velocity of the fuel jet coming through the injection nozzle is reduced in proportion to the drop in the rate of fuel delivery, resulting in bad atomization and bad combustion, with consequent heavy carbonization of the engine internal parts.

Injection systems are known which are provided with an accumulation of pressure in the pump, which maintains the injection pressure substantially constant at all speeds. However, in addition to this, the beginning and the end of injection must be timed absolutely automatically and the timing must be independent of the quantity of fuel injected.

In all known systems, where timing of the beginning of the injection by a special governor is provided, the same governor also controls the fuel supply. Such systems, though they may be satisfactory in engines where the speed increases in proportion to the load, are not satisfactory in engines running within a wide range of speeds and loads, for, in this case, the governor has to be provided with a variable load hand-operated spring, and would be simultaneously increasing the injection advance and the amount of fuel per stroke, whereas the actual requirement of the engine in some cases might be increased speed and reduced amount of fuel per stroke.

The object of the present invention is to provide an improved fuel injection pump for solid injection oil engines running at greatly varying loads and speeds, in which the load and speed conditions are quite independent of each other, such as, for example, is the case in motor cars.

According to the invention I provide a fuel pump for injecting fuel in solid injection oil engines in which the injection period, for the same amount of fuel injected per stroke, is automatically kept directly proportional, in terms of crank angle, to the engine speed, or constant, in terms of time, at all speeds, and for a given setting of the device.

The fuel may be injected at any desired and adjusted pressure, which may remain constant at all engine speeds. As will be understood, the fuel injection advance, in terms of time, is automatically kept approximately constant at all speeds, or, in terms of crank angle, approximately proportional to the engine speed.

More specifically, the invention consists in providing, in solid injection oil engines, a fuel injection pump having two governors, one governor, which may be called the timing governor, acting only on the fuel injection advance and thus also on the length of the injection period, the other governor controlling the amount of fuel injected per stroke by altering the cut-off, which will also affect the length of the injection period. The tension on the spring or other resistance element of the fuel-quantity or cut-off governor is controlled by external means according to the required load and speed of the engine.

In order to keep the rate of injection constant, an accumulator of pressure may be provided in the injection pump, thus keeping the injection pressure practically constant at all speeds.

A fuel injection pump embodying the invention will now be described, by way of example, with reference to the annexed drawings, in which:

Fig. 1 is a diagram explanatory of the working of the fuel pump, the direction of rotation being shown clockwise;

Fig. 2 is a longitudinal section of the pump;

Fig. 3 is a transverse section of the pump through the plunger cylinder and fuel cut-off valve; and Fig. 4 a sectional elevation of the timing governor.

Referring to Fig. 1, 1 is the top dead centre of the engine crank, $w$ is the angular range of the variation in the fuel injection advance, i. e. the beginning of injection, which, due to the action of the timing governor, fluctuates between the point 3 at slow speed and point 4 at the highest speed that is through the whole range of engine speeds. $x$ is the range of fuel cut-off, actuated by the fuel control governor, which fluctuates, according to the load and speed of the engine, between the point 2 at slow speed and high load and point 5, where the fuel is cut off before the injection begins, i. e. no fuel is injected into the cylinder.

The injection period $y$, in terms of crank angle corresponds to full load at slow speed, and injection period $w+y$, corresponds to the maximum injection period in terms of crank angle, for full load at highest speed.

$z_1$ is the minimum fuel injection advance in the slowest speed, and $z_2$ is the greatest fuel injection advance at the highest speed of the engine.

$n$ is the ratio of the $$\frac{\text{maximum speed}}{\text{minimum speed}}$$

of the engine, so that for the same amount of fuel injection per stroke: the injection period in terms of time = constant at all speeds, and, in terms of crank angle: the injection period is proportional to engine speed.

Due to fluctuation of the point of cut-off for reduced loads at the same speed, the injection period will be proportional to the amount of fuel injected per stroke both in terms of time and the crank angle.

As the fuel control governor must regulate the amount of fuel injected per stroke from zero to maximum at all speeds, the tension on its spring must be hand-controlled all the time the engine is running under varying speed and load conditions, while the timing governor springs must be permanently set for the governor to operate within a certain definite range of speeds, automatically adjusting the advance (or the point of the beginning of injection period) to suit the speed of the engine.

By "sensitiveness" must be understood the percentage increase in speed required to move the governor weights from their fully in to their fully out position, which will be found to be substantially the same whether the spring be tensioned to let the weights begin to move out, say, at 980 R. P. M. or 1080 R. P. M.

The initial tension of the spring must, of course, be so adjusted to that of the fuel-injection advance governor that an adequate injection period will be provided at the slowest engine speed, which period will remain constant in terms of time for all speeds at that setting.

If the setting of the cut-off governor is changed the injection period, of course, is varied but still remains constant for all speeds at that setting in terms of time.

Referring now to Figs. 2 and 3 which show one example of how a pump of this description may be constructed:—

In Fig. 2, A is the timing governor, B is the fuel control governor, and C is the injection control valve. The weights $a_1$ of the governor B are suitably guided and operate against the springs $a_7$. Each weight has a rack $a_8$ formed thereon, preferably at each side, which racks mesh respectively with the gear wheels $a_3$. (See Fig. 4.) At each side the adjacent gear wheels are meshed with one another, and one of them is secured to a gear wheel $a_4$ which meshes with a quadrantal rack $a_5$. The rack is preferably double ended and a gear wheel $a_4$ meshes with each end, being connected to diametrically opposite gears $a_3$. As the speed of the engine increases, the weights $a_1$ fly out, compressing the governor springs $a_7$ (for convenience, in the lower part of the drawings the governor weight is shown in plan) and the racks $a_8$ on the weights $a_1$ rotate the gear wheels $a_3$ in proportion to the movement of the weights, which gear wheels $a_3$, through the gear wheels $a_4$, turn the quadrant $a_5$. This quadrant through a bolt $a_2$ which passes through corresponding holes in the hollow pump shaft E, transmits the movement to the eccentric $c_1$ through the governor casing $a_6$ rotatably mounted on the shaft E and provided with slots through which the bolt $a_2$ passes.

The fuel injection control valve C is operated by eccentric $c_1$ through a spring-loaded plunger-tappet $c_2$ and a lever $c_4$. The fulcrum end of lever $c_4$ rests on an eccentric (not shown on the drawings), the position of which can be adjusted by a hand-controlled screw. $c_3$ is the passage for fuel, leading to the fuel injector.

The fuel control governor B has hinged weights $b_1$, the movement of which due to variation in the engine speed is transmitted by sliding collars $b_5$ through a bolt $b_2$, which passes through slots in the shaft E, to the inner shaft $b_3$, which takes the load of the governor spring $b_8$.

The tension on this spring can be altered by a hand or pedal operated external lever G through internal lever $g_1$.

From the shaft $b_3$, the movement of the governor B is transmitted through collars $b_4$ and quadrant $b_6$ to the helical gear wheel $b_9$, mounted on a shaft $b_7$.

As shown clearly in Fig. 3, an eccentric $d_1$ is keyed on to the pump shaft E, this eccentric operating the spring-loaded fuel pump plunger H and also controlling the suction valve, spill-valve, or cut-off valve D, through a lever $d_4$. The fulcrum end of lever $d_4$ rests on an eccentric $d_5$ rotatable on the shaft $b_7$. However, this eccentric is kept in a definite position on the shaft $b_7$ by means of a hand-adjustment screw $d_6$, which rests on a sheave crank $d_8$, keyed to the shaft $b_7$. $d_3$ is the passage for fuel from the suction pipe.

F is the spring-loaded accumulator of pressure, having a plunger $f_1$, and an adjustable spring $f_2$ acting on it.

The pump operates in the following manner:—

The eccentric-operated pump plunger H compresses the fuel in the pump, pushing the accumulator plunger $f_1$ out by a corresponding amount, and at a certain movement, corresponding to engine speed, the injection-timing valve C opens, and admits the fuel from the pump into the passage $c_3$ leading to the injector, and thus the injection begins. During injection, the fuel pressure remains constant due to accumulation of pressure. At a certain point, depending on the load and speed of the engine, the spill or cut-off valve D opens, and the pressure of fuel in the system immediately drops, due to the pump being now connected to the suction pipe. Consequently the fuel injection abruptly ceases.

The point of the beginning of injection is regulated by the timing governor A by turning the eccentric $c_1$ on the pump shaft in the manner already described, and the point of cut-off is changed by the fuel control governor B, through the lowering and lifting of the fulcrum point of the lever $d_4$ by turning the eccentric $d_5$ on the shaft $b_7$, thus opening the valve D earlier or later, as the case may be.

The speed of the engine and the amount of fuel injected per stroke can be controlled by varying the tension on the governor spring $b_8$.

The construction above described represents only one example of how the fuel injection system may be carried out in practice, and many other constructions are possible, without departing from the basic principle of the invention.

What I claim as my invention is:

1. In a fuel pump of the solid injection type, the combination of a speed-controlled governor for timing the beginning of the injection period; and a separate speed-controlled governor for timing the ending of the injection period.

2. A fuel pump as set forth in claim 1 provided with means for manually adjusting the fuel cut-off governor according to the required load and speed of the engine.

PAUL BELYAVIN.